(12) United States Patent
Feng et al.

(10) Patent No.: US 11,443,543 B2
(45) Date of Patent: Sep. 13, 2022

(54) ULTRASONIC SIGNAL DETECTING CIRCUIT, ULTRASONIC SIGNAL DETECTING METHOD, AND DISPLAY PANEL

(71) Applicant: Beijing BOE Technology Development Co., Ltd., Beijing (CN)

(72) Inventors: Yu Feng, Beijing (CN); Libin Liu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 324 days.

(21) Appl. No.: 16/630,199

(22) PCT Filed: Jun. 5, 2019

(86) PCT No.: PCT/CN2019/090147
§ 371 (c)(1),
(2) Date: Jan. 10, 2020

(87) PCT Pub. No.: WO2020/001250
PCT Pub. Date: Jan. 2, 2020

(65) Prior Publication Data
US 2020/0160021 A1    May 21, 2020

(30) Foreign Application Priority Data

Jun. 27, 2018    (CN) .......................... 201810679254.9

(51) Int. Cl.
*G06K 9/28*        (2006.01)
*G06V 40/13*       (2022.01)
(Continued)

(52) U.S. Cl.
CPC ........ *G06V 40/1306* (2022.01); *B06B 1/0238* (2013.01); *G01S 7/52085* (2013.01);
(Continued)

(58) Field of Classification Search
CPC ... G06V 40/1306; G06F 3/043–3/0436; G01N 29/2437–29/245; G01N 29/0672; B06B 1/0207–1/0284
See application file for complete search history.

(56) References Cited

U.S. PATENT DOCUMENTS 9,465,051 B1      10/2016   Schneider et al.
2013/0314148 A1   11/2013   Kang et al.
(Continued)

FOREIGN PATENT DOCUMENTS

CN    104662430 B    5/2017
CN    106896963 A    6/2017
(Continued)

*Primary Examiner* — Brian Werner
(74) *Attorney, Agent, or Firm* — Banner & Witcoff, Ltd.

(57) ABSTRACT

An ultrasonic signal detecting circuit, an ultrasonic signal detecting method, and a display panel. The ultrasonic signal detecting circuit includes a control sub-circuit and a sensing sub-circuit. The sensing sub-circuit detects an ultrasonic echo signal, and generates a piezoelectric signal, which includes a first sub signal and a second sub-signal, according to the ultrasonic echo signal, the voltage value of one of the first and second sub-signals are higher than the value of a reference voltage signal, and that of the other one of the first and second sub-signals are lower than the reference voltage signal. The control sub-circuit is electrically connected to the sensing sub-circuit. Under control of the first sub-signal, a first power supply end and an output end of the control sub-circuit are turned on; and under control of the second sub-signal, the first power supply end and the output end of the control sub-circuit are turned on.

16 Claims, 7 Drawing Sheets

(51) Int. Cl.
  *B06B 1/02* (2006.01)
  *G01S 7/52* (2006.01)
  *G06V 10/147* (2022.01)

(52) U.S. Cl.
  CPC ........ *G06V 10/147* (2022.01); *B06B 2201/55* (2013.01); *B06B 2201/70* (2013.01)

(56) References Cited

U.S. PATENT DOCUMENTS

| | | | |
|---|---|---|---|
| 2017/0059699 A1* | 3/2017 | Mathe | G01S 15/8906 |
| 2017/0110504 A1* | 4/2017 | Panchawagh | B06B 1/0207 |
| 2017/0242516 A1 | 8/2017 | Bae et al. | |
| 2017/0323134 A1 | 11/2017 | Yeo et al. | |
| 2017/0344787 A1 | 11/2017 | Cho et al. | |
| 2020/0050322 A1 | 2/2020 | Liu et al. | |

FOREIGN PATENT DOCUMENTS

| | | |
|---|---|---|
| CN | 107004121 A | 8/2017 |
| CN | 107220630 A | 9/2017 |
| CN | 107451517 A | 12/2017 |
| CN | 108140115 A | 6/2018 |
| EP | 2578324 A1 | 4/2013 |
| EP | 3637304 A1 | 4/2020 |

* cited by examiner

ULTRASONIC SIGNAL DETECTING CIRCUIT, ULTRASONIC SIGNAL DETECTING METHOD, AND DISPLAY PANEL

The application is a U.S. National Phase Entry of International Application No. PCT/CN2019/090147 filed on Jun. 5, 2019, designating the United States of America and claiming priority to Chinese Patent Application No. 201810679254.9, filed on Jun. 27, 2018. The present application claims priority to and the benefit of the above-identified applications and the above-identified applications are incorporated by reference herein in their entirety.

TECHNICAL FIELD

Embodiments of the present disclosure relate to an ultrasonic signal detection circuit, an ultrasonic signal detection method, and a display panel.

BACKGROUND

At present, an ultrasonic detection circuit can be applied to a display panel, and the ultrasonic detection circuit can be arranged on a glass substrate of the display panel for fingerprint identification and the like. However, because the leakage current of the thin film transistor, TFT) is relatively large on the glass substrate, while an ultrasonic signal reflected by a finger is relatively small, a signal-to-noise ratio of the fingerprint detection signal is low. In practical applications, it is difficult to identify the ultrasonic signals reflected by fingers. In addition, it is difficult to construct a signal amplification circuit having a complex structure due to the space limitation of glass substrate and other reasons. Therefore, in fingerprint identification techniques, sensitivity of ultrasonic detection circuit needs to be improved.

SUMMARY

At least some embodiments of the present disclosure provide an ultrasonic signal detection circuit, the ultrasonic signal detection circuit comprises a control sub-circuit and a sensing sub-circuit, the sensing sub-circuit is configured to detect an ultrasonic echo signal and generate a piezoelectric signal according to the ultrasonic echo signal, the piezoelectric signal comprises a first sub-signal and a second sub-signal, a voltage value of one of the first sub-signal and the second sub-signal is higher than a voltage value of a reference voltage signal, and a voltage value of the other of the first sub-signal and the second sub-signal is lower than the voltage value of the reference voltage signal; and the control sub-circuit is electrically connected to the sensing sub-circuit, and is configured to: connect a first power terminal and an output terminal of the control sub-circuit, under control of the first sub-signal, to transmit a power signal to the output terminal of the control sub-circuit; and connect the first power terminal and the output terminal of the control sub-circuit, under control of the second sub-signal, to transmit the power signal to the output terminal of the control sub-circuit.

For example, in the ultrasonic signal detection circuit provided by at least some embodiments of the present disclosure, the piezoelectric signal is a periodic signal, a period of the piezoelectric signal comprises a first sub-period and a second sub-period, the first sub-signal corresponds to the first sub-period, and the second sub-signal corresponds to the second sub-period.

For example, the ultrasonic signal detection circuit provided by at least some embodiments of the present disclosure further comprises an output switching sub-circuit and a read signal line, the output switching sub-circuit is respectively electrically connected to the output terminal of the control sub-circuit and the read signal line, and is configured to connect the output terminal of the control sub-circuit and the read signal line, in the first sub-period and the second sub-period, to output the power signal from the read signal line.

For example, the ultrasonic signal detection circuit provided by at least some embodiments of the present disclosure further comprises a reset sub-circuit, the reset sub-circuit is electrically connected to the control sub-circuit, and is configured to reset the control sub-circuit.

For example, in the ultrasonic signal detection circuit provided by at least some embodiments of the present disclosure, the control sub-circuit comprises a first control transistor and a second control transistor, the reset sub-circuit comprises a first reset transistor, the output terminal of the control sub-circuit comprises a second electrode of the first control transistor and a second electrode of the second control transistor, a first electrode of the first control transistor is electrically connected to the first power terminal to receive the power signal, the second electrode of the first control transistor is electrically connected to the output switching sub-circuit, a gate electrode of the first control transistor is electrically connected to a first electrode of the first reset transistor, and the gate electrode of the first control transistor is also electrically connected to an output terminal of the sensing sub-circuit; a first electrode of the second control transistor is electrically connected to the first power terminal to receive the power signal, the second electrode of the second control transistor is electrically connected to the output switching sub-circuit, a gate electrode of the second control transistor is electrically connected to the first electrode of the first reset transistor, and the gate electrode of the second control transistor is also electrically connected to the output terminal of the sensing sub-circuit; and a second electrode of the first reset transistor is electrically connected to a first reset terminal, and a gate electrode of the first reset transistor is electrically connected to a first control terminal.

For example, in the ultrasonic signal detection circuit provided by at least some embodiments of the present disclosure, the control sub-circuit comprises a first control transistor and a second control transistor, the reset sub-circuit comprises a first reset transistor and a second reset transistor, the output terminal of the control sub-circuit comprises a second electrode of the first control transistor and a second electrode of the second control transistor, a first electrode of the first control transistor is electrically connected to the first power terminal to receive the power signal, the second electrode of the first control transistor is electrically connected to the output switching sub-circuit, and a gate electrode of the first control transistor is electrically connected to a first electrode of the first reset transistor; a first electrode of the second control transistor is electrically connected to the first power terminal to receive the power signal, the second electrode of the second control transistor is electrically connected to the output switching sub-circuit, and a gate electrode of the second control transistor is electrically connected to a first electrode of the second reset transistor; a second electrode of the first reset transistor is electrically connected to a first reset terminal, and a gate electrode of the first reset transistor is electrically connected to a first control terminal; and a second electrode of the second reset transistor is electrically connected to the first reset terminal, and a gate electrode of the second reset transistor is electrically connected to the first control terminal.

For example, in the ultrasonic signal detection circuit provided by at least some embodiments of the present disclosure, the control sub-circuit comprises a first control transistor and a second control transistor, the reset sub-circuit comprises a first reset transistor and a second reset transistor, the output terminal of the control sub-circuit comprises a second electrode of the first control transistor and a second electrode of the second control transistor, a first electrode of the first control transistor is electrically connected to the first power terminal to receive the power signal, the second electrode of the first control transistor is electrically connected to the output switching sub-circuit, and a gate electrode of the first control transistor is electrically connected to a first electrode of the first reset transistor; a first electrode of the second control transistor is electrically connected to the first power terminal to receive the power signal, the second electrode of the second control transistor is electrically connected to the output switching sub-circuit, and a gate electrode of the second control transistor is electrically connected to a first electrode of the second reset transistor; a second electrode of the first reset transistor is electrically connected to a first reset terminal, and a gate electrode of the first reset transistor is electrically connected to a first control terminal; and a second electrode of the second reset transistor is electrically connected to a second reset terminal, and a gate electrode of the second reset transistor is electrically connected to the first control terminal.

For example, in the ultrasonic signal detection circuit provided by at least some embodiments of the present disclosure, the control sub-circuit further comprises a first diode and a second diode, a first electrode of the first diode is electrically connected to an output terminal of the sensing sub-circuit, and a second electrode of the first diode is electrically connected to the gate electrode of the first control transistor; and a first electrode of the second diode is electrically connected to the gate electrode of the second control transistor, and a second electrode of the second diode is electrically connected to the output terminal of the sensing sub-circuit.

For example, in the ultrasonic signal detection circuit provided by at least some embodiments of the present disclosure, the first electrode of the first diode is a positive electrode of the first diode, the second electrode of the first diode is a negative electrode of the first diode, the first electrode of the second diode is a positive electrode of the second diode, and the second electrode of the second diode is a negative electrode of the second diode.

For example, in the ultrasonic signal detection circuit provided by at least some embodiments of the present disclosure, the control sub-circuit further comprises a first capacitor and a second capacitor, a first terminal of the first capacitor is electrically connected to the gate electrode of the first control transistor, a second terminal of the first capacitor is electrically connected to a second power terminal, a first terminal of the second capacitor is electrically connected to the gate electrode of the second control transistor, and a second terminal of the second capacitor is electrically connected to a third power terminal.

For example, in the ultrasonic signal detection circuit provided by at least some embodiments of the present disclosure, the first control transistor and the second control transistor are different types of transistors.

For example, in the ultrasonic signal detection circuit provided by at least some embodiments of the present disclosure, the output switching sub-circuit comprises a switching transistor, a first electrode of the switching transistor is respectively electrically connected to the second electrode of the first control transistor and the second electrode of the second control transistor, a second electrode of the switching transistor is electrically connected to the read signal line, and a gate electrode of the switching transistor is electrically connected to a second control terminal.

For example, in the ultrasonic signal detection circuit provided by at least some embodiments of the present disclosure, a duration of the first sub-period is identical to a duration of the second sub-period.

For example, in the ultrasonic signal detection circuit provided by at least some embodiments of the present disclosure, the first sub-period and the second sub-period are adjacent in time, and are alternately arranged.

For example, in the ultrasonic signal detection circuit provided by at least some embodiments of the present disclosure, the piezoelectric signal is a sinusoidal voltage signal.

For example, in the ultrasonic signal detection circuit provided by at least some embodiments of the present disclosure, the sensing sub-circuit comprises an ultrasonic sensor, a first terminal of the ultrasonic sensor is electrically connected to the control sub-circuit, and a second terminal of the ultrasonic sensor is electrically connected to a reference voltage terminal to receive the reference voltage signal.

At least some embodiments of that present disclosure also provide a display panel, the display panel comprises a base substrate and the ultrasonic signal detection circuit according to any one of the above embodiments, and the ultrasonic signal detection circuit is provided on the base substrate.

At least some embodiments of that present disclosure also provide an ultrasonic signal detection method of the ultrasonic signal detection circuit according to any one of the above embodiments, the ultrasonic signal detection method comprises: in a data acquisition stage, detecting the ultrasonic echo signal, and generating the piezoelectric signal according to the ultrasonic echo signal; in the first sub-period, connecting the first power terminal and the output terminal of the control sub-circuit, under control of the first sub-signal, to transmit the power signal to the output terminal of the control sub-circuit; and in the second sub-period, connecting the first power terminal and the output terminal of the control sub-circuit, under control of the second sub-signal, to transmit the power signal to the output terminal of the control sub-circuit.

For example, in the ultrasonic signal detection method provided by at least some embodiments of the present disclosure, the control sub-circuit comprises a first control transistor and a second control transistor, in the first sub-period, the first control transistor is controlled to be turned on and the second control transistor is controlled to be turned off by the first sub-signal, and the power signal is transmitted to the output terminal of the control sub-circuit via the first control transistor; and in the second sub-period, the first control transistor is controlled to be turned off and the second control transistor is controlled to be turned on by the second sub-signal, and the power signal is transmitted to the output terminal of the control sub-circuit via the second control transistor.

For example, in the ultrasonic signal detection method provided by at least some embodiments of the present disclosure, the control sub-circuit comprises a first control transistor and a second control transistor, in the first sub-period, by the first sub-signal, the first control transistor is controlled to be turned on, a connection of the second control transistor and the sensing sub-circuit is turned off to turn on the second control transistor, and the power signal is transmitted to the output terminal of the control sub-circuit via the first control transistor and the second control transistor; and in the second sub-period, the second control transistor is controlled to be turned on by the second sub-signal, a connection of the first control transistor and the sensing sub-circuit is turned off to turn on the first control transistor, and the power signal is transmitted to the output terminal of the control sub-circuit via the first control transistor and the second control transistor.

For example, in the ultrasonic signal detection method provided by at least some embodiments of the present disclosure, in the data acquisition stage, the power signal is outputted to the read signal line in the first sub-period and the second sub-period; and the ultrasonic signal detection method further comprises: in a reset stage, resetting the control sub-circuit.

BRIEF DESCRIPTION OF THE DRAWINGS

In order to clearly illustrate the technical solutions of the embodiments of the present disclosure, the drawings of the embodiments will be briefly described in the following; and it is obvious that the described drawings are only related to some embodiments of the present disclosure and thus are not limitative to the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

In order to keep the following description of embodiments of the present disclosure clear and concise, detailed descriptions of some known functions and known components are omitted from the present disclosure.

Figure 1:
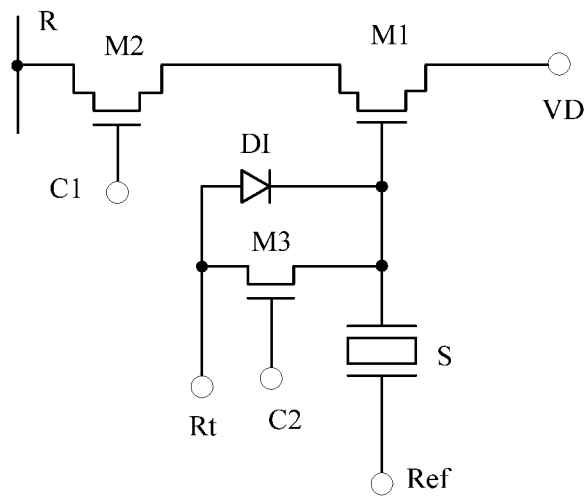
FIG. 1 is a structural schematic diagram of an ultrasonic signal detection circuit.

FIG. 1 is a structural schematic diagram of an ultrasonic detection circuit. As shown in FIG. 1, the ultrasonic detection circuit includes a first transistor M1, a second transistor M2, a third transistor M3, an ultrasonic sensor S, and a diode D1. The first transistor M1, the second transistor M2, and the third transistor M3 are all N-type transistors. In a reset stage, a control signal output from a data acquisition control terminal C1 is a low-level signal, and a control signal output from a reset control terminal C2 is a high-level signal, so that the second transistor M2 is turned off, the third transistor M3 is turned on, and a reset voltage Rt is transmitted to a gate electrode of the first transistor M1 via the third transistor M3, thereby resetting the gate electrode of the first transistor M1. In a data acquisition stage, the control signal output by the data acquisition control terminal C1 is a high-level signal, and the control signal output by the reset control terminal C2 is a low-level signal, so that the second transistor M2 is turned on, the third transistor M3 is turned off, the ultrasonic sensor S receives ultrasonic echo signals and generates sinusoidal piezoelectric signals according to the ultrasonic echo signals, and the sinusoidal piezoelectric signals include a positive voltage sub-signal and a negative voltage sub-signal. In a case where the ultrasonic sensor S outputs the positive voltage sub-signal, the positive voltage sub-signal is transmitted to the gate electrode of the first transistor M1, the first transistor M1 is turned on, and a power signal of the first power terminal VD can be sequentially output to a read line R via the first transistor M1 and the second transistor M2, thereby realizing detection of the ultrasonic echo signals. For example, in the data acquisition stage, in a case where the ultrasonic sensor S outputs a positive voltage sub-signal, the diode D1 is turned off. In a case where the ultrasonic sensor S outputs a negative voltage sub-signal, the negative voltage sub-signal is transmitted to the gate electrode of the first transistor M1, and the first transistor M1 is turned off, so that the read line R cannot read the power signal. At this time, the negative voltage sub-signal can be transmitted to a cathode of the diode D1, the diode D1 is turned on, and the reset voltage Rt is transmitted to the gate electrode of the first transistor M1, so that a voltage of the gate electrode of the first transistor M1 keeps at the reset voltage Rt. In the ultrasonic detection circuit as shown in FIG. 1, the first transistor M1 can transmit the power signal to the read line R only in a case where the ultrasonic sensor S outputs a positive voltage sub-signal, a signal detected by the ultrasonic detection circuit is small, and it is difficult to realize fingerprint identification.

At least some embodiments of the present disclosure provide an ultrasonic signal detection circuit, an ultrasonic signal detection method, and a display panel. The ultrasonic signal detection circuit can output a power signal in both a first sub-period and a second sub-period, and utilize both a first sub-signal in the first sub-period and a second sub-signal in the second sub-period of the piezoelectric signal obtained based on the ultrasonic echo signal, thereby improving an utilization efficiency of the ultrasonic echo signal, increasing a duration for outputting the power signal, increasing an output signal of the ultrasonic signal detection circuit, and improving a signal-to-noise ratio.

Some embodiments of the present disclosure will be described in detail below with reference to the accompanying drawings, but the present disclosure is not limited to these specific embodiments.

It should be noted that the transistors used in the embodiments of the present disclosure can all be thin film transistors (e.g., polysilicon thin film transistors, amorphous silicon thin film transistors, oxide thin film transistors, or organic thin film transistors), field effect transistors, or other switching elements with the same characteristics. A source electrode and a drain electrode of a transistor used here may be symmetrical in structure, so the source electrode and the drain electrode of the transistor can be indistinguishable in structure. In the embodiments of the present disclosure, in order to distinguish the two electrodes of the transistor except a gate electrode of the transistor, one of the two electrodes is directly described to be a first electrode, and the other electrode is directly described to be a second electrode, so the first electrode and the second electrode of all or part of the transistors in the embodiments of the present disclosure are interchangeable as required. For example, the first electrode of the transistor described in the embodiment of the present disclosure may be a source electrode, and the second electrode of the transistor may be a drain electrode; alternatively, the first electrode of the transistor may be a drain electrode, and the second electrode of the transistor may be a source electrode.

For example, according to characteristics of transistors, transistors can be divided into N-type transistors and P-type transistors. For the sake of clarity, in the following description of the present disclosure, a second control transistor is a P-type transistor, and the remaining transistors, other than the second control transistor, of the present disclosure are all N-type transistors. However, the embodiments of the present disclosure are not limited to this case. Those skilled in the art can also realize the function of the second control transistor in the embodiment of the present disclosure by using an N-type transistor, and realize the function of the remaining transistors in the embodiment of the present disclosure by using P-type transistors according to actual needs.

Figure 2:
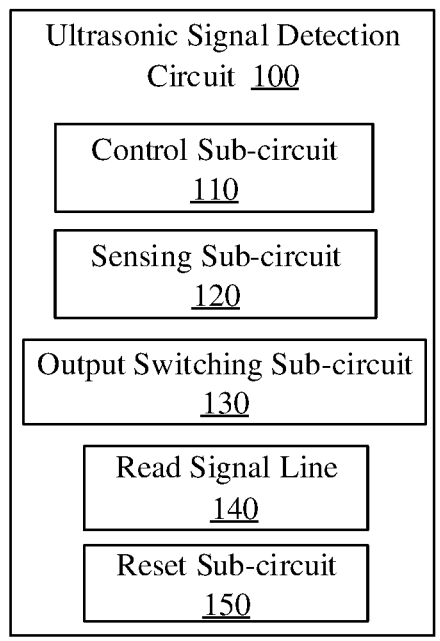
FIG. 2 is a schematic block diagram of an ultrasonic signal detection circuit provided by some embodiments of the present disclosure.

FIG. 2 is a schematic block diagram of an ultrasonic signal detection circuit provided by some embodiments of the present disclosure. For example, as shown in FIG. 2, the ultrasonic signal detection circuit 100 provided by some embodiments of the present disclosure may include a control sub-circuit 110 and a sensing sub-circuit 120, and the control sub-circuit 110 is electrically connected to the sensing sub-circuit 120.

For example, the sensing sub-circuit 120 is configured to detect an ultrasonic echo signal and generate a piezoelectric signal according to the ultrasonic echo signal. For example, the piezoelectric signal includes a first sub-signal and a second sub-signal, a voltage value of one of the first sub-signal and the second sub-signal is higher than a voltage value of a reference voltage signal, and a voltage value of the other of the first sub-signal and the second sub-signal is lower than the voltage value of the reference voltage signal.

For example, the piezoelectric signal is a periodic signal, a period of the piezoelectric signal includes a first sub-period and a second sub-period, the first sub-signal corresponds to the first sub-period, and the second sub-signal corresponds to the second sub-period, that is, the piezoelectric signal includes a first sub-signal in the first sub-period and a second sub-signal in the second sub-period.

For example, the control sub-circuit 110 is configured to: in the first sub-period, connect a first power terminal and an output terminal of the control sub-circuit 110, under control of the first sub-signal, to transmit a power signal Vdd to the output terminal of the control sub-circuit 110; and in the second sub-period, connect the first power terminal and the output terminal of the control sub-circuit 110, under control of the second sub-signal, to transmit the power signal Vdd to the output terminal of the control sub-circuit 110.

The ultrasonic signal detection circuit provided by the embodiment of the present disclosure can transmit the power signal in both the first sub-period and the second sub-period, compared with the circuit as shown in FIG. 1, the ultrasonic signal detection circuit 100 increases the duration of outputting the power signal Vdd (for example, the duration, which is increased, is a duration of the second sub-period), thereby improving the utilization efficiency of ultrasonic echo signals, increasing the detected output signals, and improving the signal-to-noise ratio of the detected output signals.

For example, an amplitude of the piezoelectric signal is related to an intensity of the ultrasonic echo signal. The greater the intensity of the ultrasonic echo signal, the greater the amplitude of the piezoelectric signal.

For example, a duration of the first sub-period and the duration of the second sub-period may be the same, so that the duration of outputting the power signal Vdd by the ultrasonic signal detection circuit 10 is doubled, and an accumulated charge is doubled, that is, the output signal detected by the ultrasonic signal detection circuit 100 is doubled.

It should be noted that the duration of the first sub-period and the duration of the second sub-period may be different, and this present disclosure is not limited to this case.

For example, the first sub-period and the second sub-period are adjacent in time and are alternately arranged. That is to say, the first sub-period and the second sub-period are continuous in time. In a case where the first sub-period ends, the second sub-period starts, and in a case where the second sub-period ends, the first sub-period starts. The second sub-period is between any two adjacent first sub-periods, and the first sub-period is between any two adjacent second sub-periods.

For example, the power signal Vdd may be a high-level signal.

For example, as shown in FIG. 2, the ultrasonic signal detection circuit 100 may further include an output switching sub-circuit 130 and a read signal line 140. The output switching sub-circuit 130 is electrically connected to the output terminal of the control sub-circuit 110 and the read signal line 140, and the output switching sub-circuit 130 is configured to connect the output terminal of the control sub-circuit 110 and the read signal line 140, in the first sub-period and the second sub-period, to output the power signal Vdd from the read signal line 140.

For example, the output switching sub-circuit 130 can be used to control the output of the power signal Vdd to the read signal line 140, so that the duration for reading the power signal Vdd can be flexibly controlled to satisfy different application requirements.

For example, the read signal line 140 may be electrically connected to a voltage detection sub-circuit (not shown in Figure). In the first sub-period and the second sub-period, the power signal Vdd may charge the voltage detection sub-circuit via the read signal line 140 to obtain an output signal. In a case where the ultrasonic echo signal is a signal obtained by reflecting an ultrasonic signal from a finger, the output signal can be used as a fingerprint identification signal to realize fingerprint identification.

For example, as shown in FIG. 2, the ultrasonic signal detection circuit 100 further includes a reset sub-circuit 150. The reset sub-circuit 150 is electrically connected to the control sub-circuit 110, and is configured to reset the control sub-circuit 100. The reset sub-circuit 150 can ensure that the control sub-circuit 100 is in a reset state before a data acquisition stage (i.e., a stage when the ultrasonic signal detection circuit starts detecting signals) starts, thereby avoiding a case that when the sensing sub-circuit 120 does not output a piezoelectric signal, the first control transistor T1 or the second control transistor T2 is in a turn-on state in the data acquisition stage, i.e., the reset sub-circuit 150 can avoid the influence of a previous data acquisition stage on a next data acquisition stage, thereby improving the accuracy of the output signal.

FIGS. 3-7 are structural schematic diagrams of various ultrasonic signal detection circuits provided by embodiments of the present disclosure. For example, as shown in FIGS. 3-7, the control sub-circuit 110 may include a first control transistor T1 and a second control transistor T2. The output terminal of the control sub-circuit 110 includes a second electrode of the first control transistor T1 and a second electrode of the second control transistor T2, and the second electrode of the first control transistor T1 is connected to the second electrode of the second control transistor T2.

For example, the first control transistor T1 and the second control transistor T2 are different types of transistors. As shown in FIGS. 3-7, in some examples, the first control transistor T1 is an N-type transistor, and the second control transistor T2 is a P-type transistor. But the embodiments of the present disclosure are not limited to this case, in other examples, the first control transistor T1 is a P-type transistor, and the second control transistor T2 is an N-type transistor.

Figure 3:
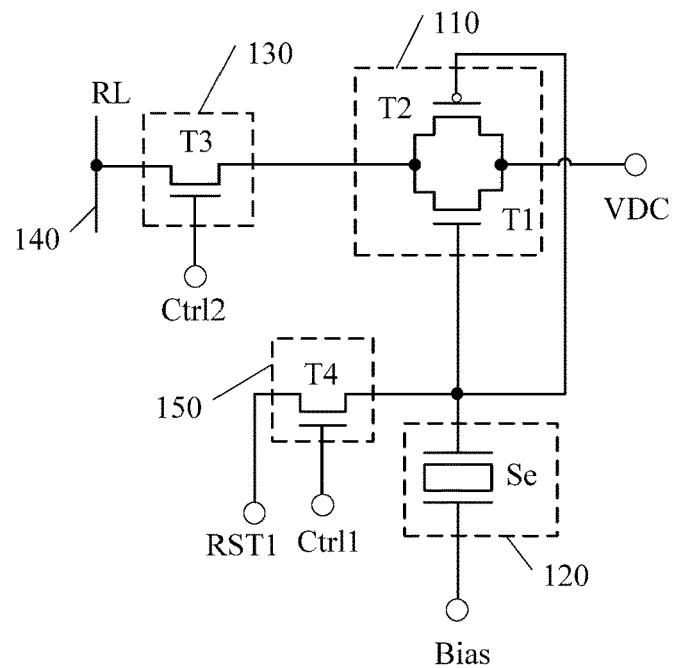
FIG. 3 is a structural schematic diagram of an ultrasonic signal detection circuit provided by some embodiments of the present disclosure.

For example, as shown in FIG. 3, in some examples, the reset sub-circuit 150 may include a first reset transistor T4.

For example, as shown in FIG. 3, a first electrode of the first control transistor T1 is electrically connected to the first power terminal VDC to receive the power signal Vdd, a second electrode of the first control transistor T1 is electrically connected to the output switching sub-circuit 130, a gate electrode of the first control transistor T1 is electrically connected to a first electrode of the first reset transistor T4, and the gate electrode of the first control transistor T1 is also electrically connected to an output terminal of the sensing sub-circuit 120. A first electrode of the second control transistor T2 is electrically connected to the first power terminal VDC to receive the power signal Vdd, a second electrode of the second control transistor T2 is electrically connected to the output switching sub-circuit 130, a gate electrode of the second control transistor T2 is electrically connected to the first electrode of the first reset transistor T4, and the gate electrode of the second control transistor T2 is also electrically connected to the output terminal of the sensing sub-circuit 120.

For example, a second electrode of the first reset transistor T4 is electrically connected to a first reset terminal RST1, and a gate electrode of the first reset transistor T4 is electrically connected to a first control terminal Ctrl1.

For example, as shown in FIG. 3, the first reset terminal RST1 is configured to output a first reset signal Vrst1, which simultaneously resets the gate electrode of the first control transistor T1 and the gate electrode of the second control transistor T2 via the first reset transistor T4.

For example, the first sub-signal may control the first control transistor T1 to be turned on, and the first sub-signal may control the second control transistor T2 to be turned off; while the second sub-signal may control the first control transistor T1 to be turned off, and the second sub-signal may control the second control transistor T2 to be turned on. As shown in FIG. 3, in the first sub-period, under control of the first sub-signal, the first control transistor T1 is turned on, the second control transistor T2 is turned off, and the power signal Vdd is transmitted to the output switching sub-circuit 130 via the first control transistor T1. In the second sub-period, under control of the second sub-signal, the first control transistor T1 is turned off, the second control transistor T2 is turned on, and the power signal Vdd is transmitted to the output switching sub-circuit 130 via the second control transistor T2. Therefore, the power signal Vdd can be transmitted to the output switching sub-circuit 130 in both the first sub-period and the second sub-period.

Figure 4:
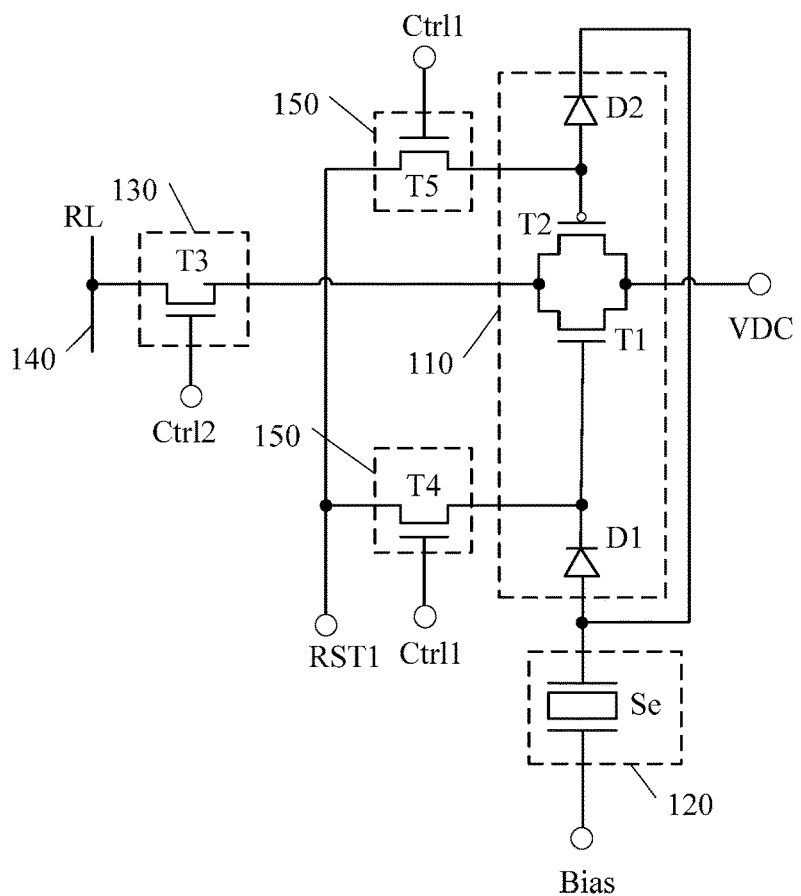
FIG. 4 is a structural schematic diagram of another ultrasonic signal detection circuit provided by some embodiments of the present disclosure.
Figure 5:
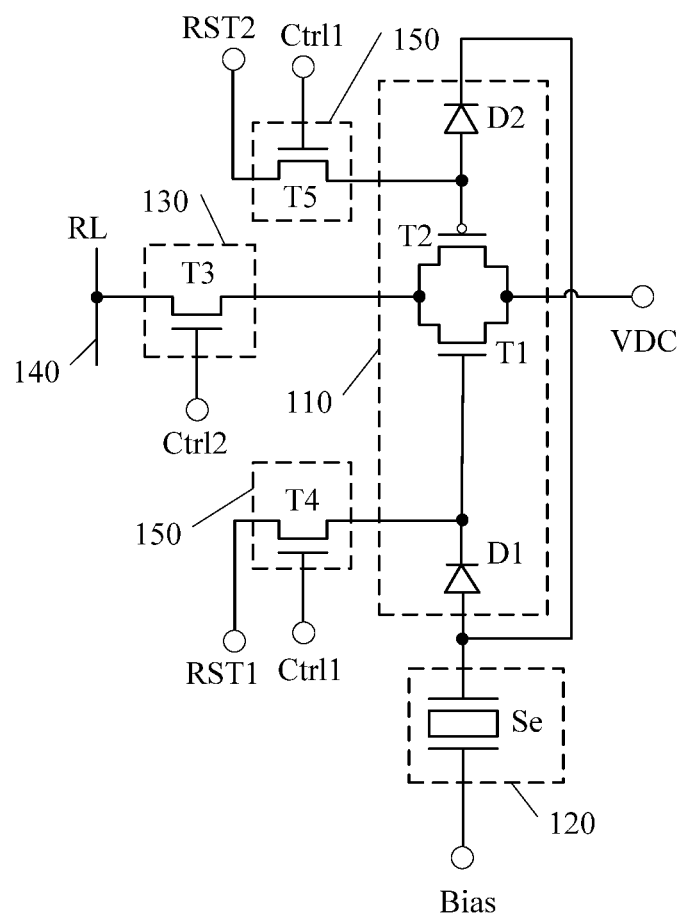
FIG. 5 is a structural schematic structural diagram of yet another ultrasonic signal detection circuit provided by some embodiments of the present disclosure.

For example, as shown in FIGS. 4 and 5, in other examples, the reset sub-circuit 150 includes a first reset transistor T4 and a second reset transistor T5.

For example, as shown in FIGS. 4 and 5, a first electrode of the first control transistor T1 is electrically connected to the first power terminal VDC to receive the power signal Vdd, a second electrode of the first control transistor T1 is electrically connected to the output switching sub-circuit 130, and a gate electrode of the first control transistor T1 is electrically connected to a first electrode of the first reset transistor T4. A first electrode of the second control transistor T2 is electrically connected to the first power terminal VDC to receive the power signal Vdd, a second electrode of the second control transistor T2 is electrically connected to the output switching sub-circuit 130, and a gate electrode of the second control transistor T2 is electrically connected to a first electrode of the second reset transistor T5.

For example, as shown in FIG. 4, a second electrode of the first reset transistor T4 is electrically connected to a first reset terminal RST1, and a gate electrode of the first reset transistor T4 is electrically connected to a first control terminal Ctrl1. A second electrode of the second reset transistor T5 is electrically connected to the first reset terminal RST1, and a gate electrode of the second reset transistor T5 is electrically connected to the first control terminal Ctrl1.

For example, as shown in FIG. 4, the first reset terminal RST1 is configured to output a first reset signal Vrst1, which can reset the gate electrode of the first control transistor t1 via the first reset transistor T4, while the first reset signal Vrst1 can also reset the gate electrode of the second control transistor T2 via the second reset transistor T5.

For example, in the example shown in FIG. 4, the second electrode of the first reset transistor T4 and the second electrode of the second reset transistor T5 are both connected to a same reset terminal (i.e., the first reset terminal RST1), but the embodiments of the present disclosure are not limited thereto, and the second electrode of the first reset transistor T4 and the second electrode of the second reset transistor T5 may also be connected to different reset terminals. For example, as shown in FIG. 5, the second electrode of the first reset transistor T4 is electrically connected to the first reset terminal RST1, and the gate electrode of the first reset transistor T4 is electrically connected to the first control terminal Ctrl1; the second electrode of the second reset transistor T5 is electrically connected to a second reset terminal RST2, and the gate electrode of the second reset transistor T5 is electrically connected to the first control terminal Ctrl1.

For example, because the first control transistor T1 and the second control transistor T2 are different types of transistors, reset can be performed by different reset signals on the first control transistor T1 and the second control transistor T2. For example, as shown in FIG. 5, the first reset terminal RST1 is configured to output the first reset signal Vrst1, the second reset terminal RST2 is configured to output the second reset signal Vrst2, and the first reset signal Vrst1 and the second reset signal Vrst2 are different. In a case where a first control signal C1 controls the first reset transistor T4 and the second reset transistor T5 to be turned on simultaneously, the first reset signal Vrst1 is transmitted to the gate electrode of the first control transistor T1 via the first reset transistor T4 to reset the gate electrode of the first control transistor T1, and the second reset signal Vrst2 is transmitted to the gate electrode of the second control transistor T2 via the second reset transistor T5 to reset the gate electrode of the second control transistor T2.

For example, as shown in FIGS. 4 and 5, the first reset transistor T4 and the second reset transistor T5 may be the same type of transistors, and the first reset transistor T4 and the second reset transistor T5 may be turned on or off simultaneously. For example, in the example shown in FIGS. 4 and 5, the first control terminal Ctrl1 outputs a first control signal C1, which can control the first reset transistor T4 and the second reset transistor T5 to be turned on or off simultaneously to reset the gate electrode of the first control transistor T1 and the gate electrode of the second control transistor T2 simultaneously.

It should be noted that in the example shown in FIGS. 4 and 5, the gate electrode of the first reset transistor T4 and the gate electrode of the second reset transistor T5 are connected to the same control terminal (i.e., the first control terminal Ctrl1), but the embodiments of the present disclosure are not limited thereto, and the gate electrode of the first reset transistor T4 and the gate electrode of the second reset transistor T5 may also be connected to different control terminals. In addition, according to actual application requirements, the first reset transistor T4 and the second reset transistor T5 may not be turned on or off at the same time, and this present disclosure is not limited to this case.

For example, as shown in FIGS. 4 and 5, the control sub-circuit 110 further includes a first diode D1 and a second diode D2. A first electrode of the first diode D1 is electrically connected to the output terminal of the sensing sub-circuit 120, and a second electrode of the first diode D1 is electrically connected to the gate electrode of the first control transistor T1. A first electrode of the second diode D2 is electrically connected to the gate electrode of the second control transistor T2, and a second electrode of the second diode D2 is electrically connected to the output terminal of the sensing sub-circuit 120.

For example, as shown in FIGS. 4 and 5, in the first sub-period of a first period of the piezoelectric signal, under control of the first sub-signal, the first diode D1 is turned on, and the second diode D2 is turned off, so that the first sub-signal is transmitted to the gate electrode of the first control transistor T1 to control the first control transistor T1 to be turned on, while a voltage of the gate electrode of the second control transistor T2 is still the first reset signal Vrst1, that is, the second control transistor T2 is turned off. In the second sub-period of the first period of the piezoelectric signal, under control of the second sub-signal, the second diode D2 is turned on, so that the second sub-signal is transmitted to the gate electrode of the second control transistor T2 to control the second control transistor T2 to be turned on, and the first diode D1 is turned off, thereby preventing the second sub-signal from being transmitted to the gate electrode of the first control transistor T1. Because the period of the piezoelectric signal is short (for example, the period of the piezoelectric signal is much shorter than a duration of collecting the power signal by the reading signal line), so that a voltage of the gate electrode of the first control transistor T1 can still be kept at a voltage of the first sub-signal during the second sub-period of the first period of the piezoelectric signal, and the first control transistor T1 is kept in a turn-on state, that is, both the first control transistor T1 and the second control transistor T2 are turned on during the second sub-period of the first period of the piezoelectric signal. The power signal Vdd can be transmitted to the output terminal of the control sub-circuit 110 respectively via the first control transistor T1 and the second control transistor T2, that is, the transmission speed of the power signal Vdd is higher.

For example, in the first sub-period of a second period of the piezoelectric signal, under control of the first sub-signal, the first diode D1 is turned on, so that the first sub-signal is transmitted to the gate electrode of the first control transistor T1 to control the first control transistor T1 to be turned on, and the second diode D2 is turned off, thus preventing the first sub-signal from being transmitted to the gate electrode of the second control transistor T2. At this time, the voltage of the gate electrode of the second control transistor T2 can still be kept at a voltage the second sub-signal. The first control transistor T1 is kept in a turn-on state, so that both the first control transistor T1 and the second control transistor T2 are turned on in the first sub-period of the second period of the piezoelectric signal, and similarly both the first control transistor T1 and the second control transistor T2 are turned on in the second sub-period of the second period of the piezoelectric signal. Therefore, in the example as shown in FIGS. 4 and 5, except for the first period, in the first sub-period and the second sub-period of the remaining periods of the piezoelectric signal, both the first control transistor T1 and the second control transistor T2 are turned on, thereby increasing the transmission speed of the power signal Vdd and further increasing the detected output signal.

Figure 6:
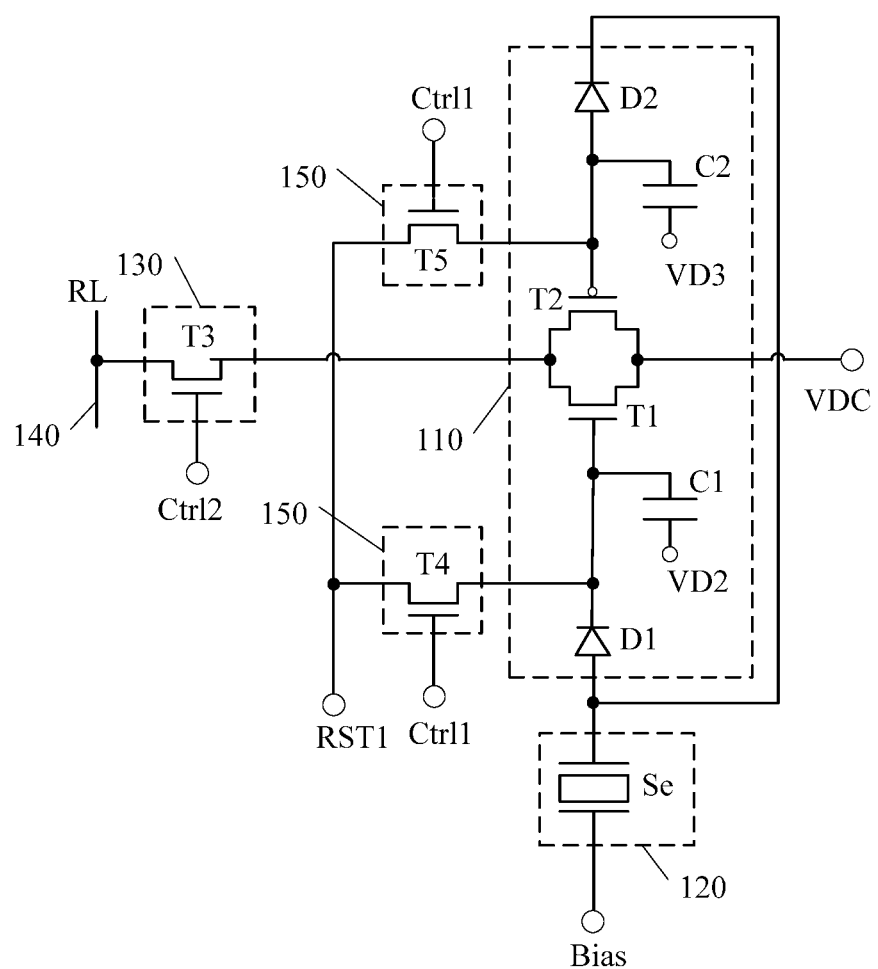
FIG. 6 is a structural schematic diagram of an ultrasonic signal detection circuit provided by other embodiments of the present disclosure.
Figure 7:
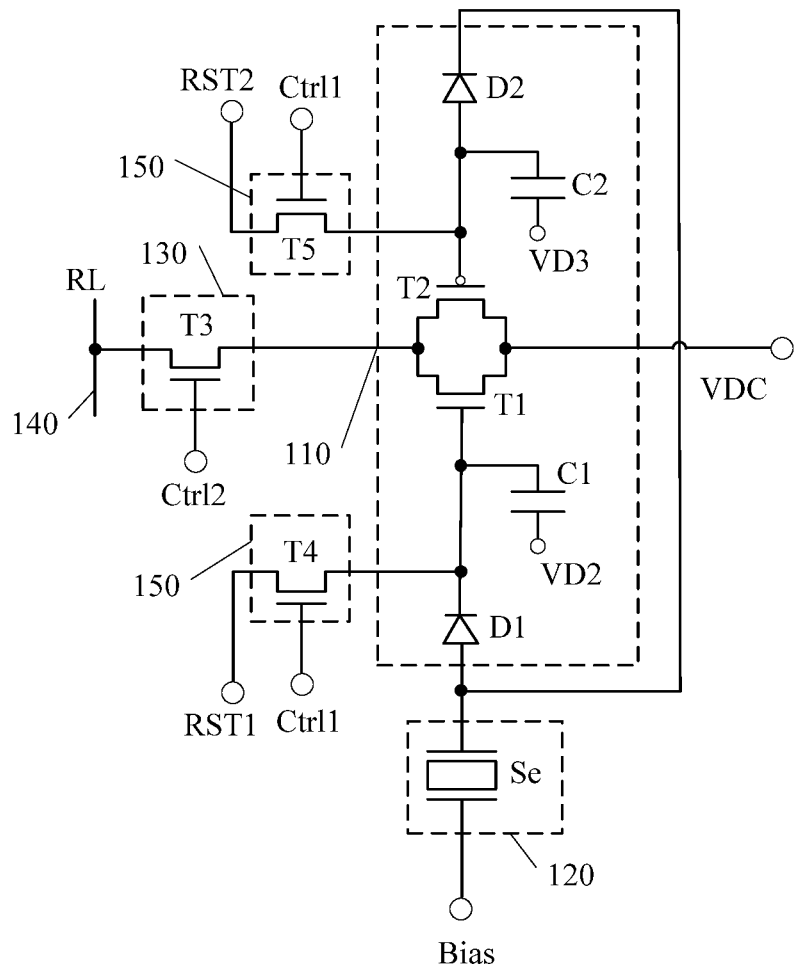
FIG. 7 is a structural schematic diagram of yet another ultrasonic signal detection circuit provided by other embodiments of the present disclosure.

For example, as shown in FIGS. 6 and 7, in some examples, the control sub-circuit 110 may further include a first capacitor C1 and a second capacitor C2, a first terminal of the first capacitor C1 may be electrically connected to the gate electrode of the first control transistor T1, a second terminal of the first capacitor C1 may be electrically connected to a second power terminal VD2, a first terminal of the second capacitor C2 may be electrically connected to the gate electrode of the second control transistor T2, and a second terminal of the second capacitor C2 may be electrically connected to a third power terminal VD3. For example, the second power terminal VD2 and the third power terminal VD3 are both grounded. In the first sub-period, the second capacitor C2 can keep the voltage of the gate electrode of the second control transistor T2 to ensure that the second control transistor T2 remains to be turning on; and in the second sub-period, the first capacitor C1 can keep the voltage of the gate electrode of the first control transistor T1 to ensure that the first control transistor T1 remains to be turning on.

For example, the first electrode of the first diode D1 is a positive electrode of the first diode D1, and the second electrode of the first diode D1 is a negative electrode of the first diode D1. That is, in a case where a positive voltage is applied to the first electrode of the first diode D1 and a negative voltage is applied to the second electrode of the first diode D1, the first diode D1 is turned on. Similarly, the first electrode of the second diode D2 is a positive electrode of the second diode D2, and the second electrode of the second diode D2 is a negative electrode of the second diode D2. However, the embodiments of the present disclosure are not limited to this case. According to actual design requirements, the first electrode of the first diode D1 is the negative electrode of the first diode D1, and the second electrode of the first diode D1 is the positive electrode of the first diode D1. The first electrode of the second diode D2 is the negative electrode of the second diode D2 and the second electrode of the second diode D2 is the positive electrode of the second diode D2. At this time, only the types of the first control transistor T1 and the second control transistor T2 need to be changed accordingly.

To sum up, in the present disclosure, as shown in FIGS. 4 and 5, the control sub-circuit 110 includes only two transistors and two diodes, which can transmit power signals in both the first sub-period and the second sub-period. As shown in FIGS. 6 and 7, the control sub-circuit 110 includes only two transistors, two diodes and two capacitors, which can transmit power signals in both the first sub-period and the second sub-period. The control sub-circuit 110 has a simple structure and low production cost.

For example, as shown in FIGS. 3-7, the output switching sub-circuit 130 may include a switching transistor T3. A first electrode of the switching transistor T3 is electrically connected to the second electrode of the first control transistor T1 and the second electrode of the second control transistor T2, a second electrode of the switching transistor T3 is electrically connected to the read signal line RL, and a gate electrode of the switching transistor T3 is electrically connected to the second control terminal Ctrl2.

For example, as shown in FIGS. 3-7, the sensing sub-circuit 120 includes an ultrasonic sensor Se. A first terminal of the ultrasonic sensor Se is electrically connected to the control sub-circuit 110, and a second terminal of the ultrasonic sensor Se is electrically connected to a reference voltage terminal Bias to receive the reference voltage signal Vb. The reference voltage signal Vb can add a DC component to the piezoelectric signal to ensure that the first sub-signal can control the first control transistor T1 to be turned on and the second sub-signal can control the second control transistor T2 to be turned on.

For example, the reference voltage signal Vb is a DC signal.

Figure 8:
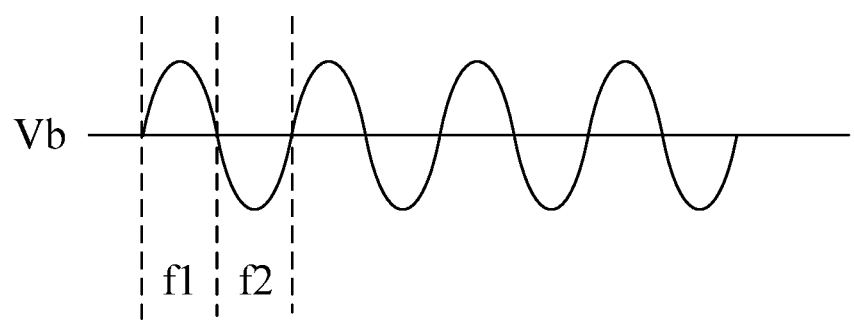
FIG. 8 is a schematic diagram of a piezoelectric signal provided by some embodiments of the present disclosure.

For example, as shown in FIG. 8, the piezoelectric signal may be a sinusoidal voltage signal. But the embodiments of the present disclosure are not limited to this case, the piezoelectric signal may also be a square wave signal, a triangular wave signal, or the like.

For example, as shown in FIG. 8, in some examples, in the first sub-period f1, the sinusoidal wave signal is the first sub-signal, and the first sub-signal is larger than the reference voltage signal Vb; and in the second sub-period f2, the sinusoidal wave signal is the second sub-signal, and the second sub-signal is smaller than the reference voltage signal Vb. That is, the voltage value of the first sub-signal is lager that the voltage value of the reference voltage signal Vb; the voltage value of the second sub-signal is less than the voltage value of the reference voltage signal Vb. However, the present disclosure is not limited thereto, and in other examples, the first sub-signal is smaller than the reference voltage signal Vb, and the second sub-signal is larger than the reference voltage signal Vb. The first sub-signal, the second sub-signal, and the reference voltage signal Vb can all be set according to actual application requirements.

For example, the ultrasonic sensor Se may include a piezoelectric material, and the piezoelectric material may be a piezoelectric polymer composite piezoelectric material, for example, the piezoelectric polymer composite piezoelectric material may include polyvinylidene fluoride (PVDF), so that the ultrasonic sensor Se is a polyvinylidene fluoride piezoelectric sensor, and the polyvinylidene fluoride has advantages, such as being not easy to break, waterproof, capable of continuous drawing in large quantities, low in price, wide in frequency response range, and the like. It should be noted that the piezoelectric material may also be a piezoelectric single crystal, a piezoelectric ceramic, and the like. The piezoelectric single crystal may include, for example, quartz ($SiO_2$), lithium niobate ($LiNbO_3$), and the like. The piezoelectric ceramic may include, for example, barium titanate ($BaTiO_3$), lead zirconate titanate ($Pb(Zr_{1-x}Ti_x)O_3$), and the like.

Figure 9:
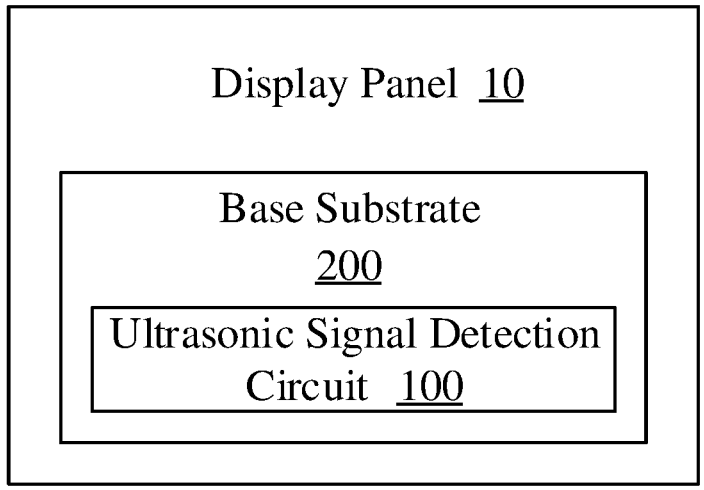
FIG. 9 is a schematic block diagram of a display panel provided by some embodiments of the present disclosure.

Some embodiments of the present disclosure also provide a display panel, and FIG. 9 is a schematic block diagram of a display panel provided by some embodiments of the present disclosure. For example, as shown in FIG. 9, the display panel 10 may include the ultrasonic signal detection circuit 100 according to any one of the above embodiments of the present disclosure.

In the display panel provided by the embodiment of the present disclosure, the ultrasonic signal detection circuit can improve the utilization efficiency of ultrasonic echo signals, increase the duration for outputting power signals, improve the signal-to-noise ratio, and in a case where the ultrasonic signal detection circuit is applied to fingerprint identification, the accuracy of fingerprint identification can be improved.

For example, the display panel 10 may include a base substrate 200, and the ultrasonic signal detection circuit 100 may be disposed on the base substrate 200.

For example, the base substrate 200 may include a glass substrate, a quart substrate, or the like.

For example, the display panel 10 may further include a signal generator, and the signal generator is configured to generate and emit ultrasonic signals. In a case where the ultrasonic signal detection circuit is applied to fingerprint identification, the ultrasonic signal can be reflected by a finger to obtain the ultrasonic echo signal. The ultrasonic sensor in the ultrasonic signal detection circuit 100 can detect the ultrasonic echo signal and generate the piezoelectric signal according to the ultrasonic echo signal. The control sub-circuit in the ultrasonic signal detection circuit 100 controls the duration of outputting the power signal according to the piezoelectric signal. In the data acquisition stage, the read signal line reads the power signal to obtain an output signal, and fingerprint identification can be realized according to the output signal.

For example, the display panel 10 may be a rectangular panel, a circular panel, an oval panel, a polygonal panel, or the like. In addition, the display panel 10 may be not only a planar panel, but also a curved panel or even a spherical panel.

For example, the display panel 10 can be applied to any product or component having a display function, such as a mobile phone, a tablet computer, a television, a display, a notebook computer, a digital photo frame, a navigator, and the like.

Figure 10:
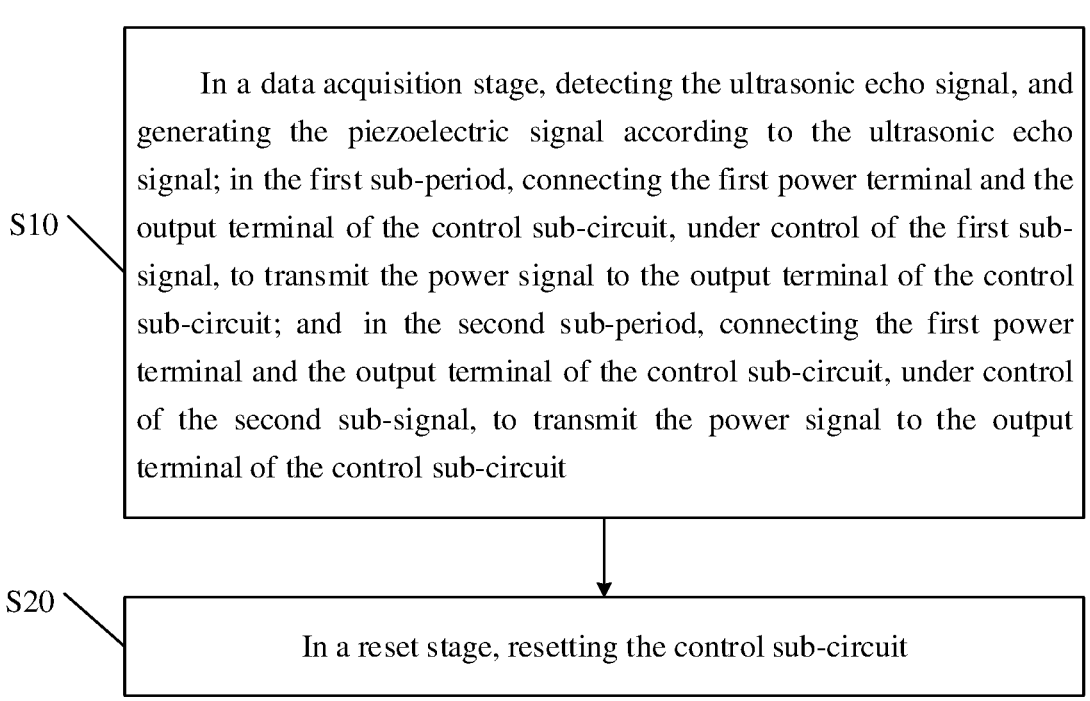
FIG. 10 is a flowchart of an ultrasonic signal detection method provided by some embodiments of the present disclosure.
Figure 11:
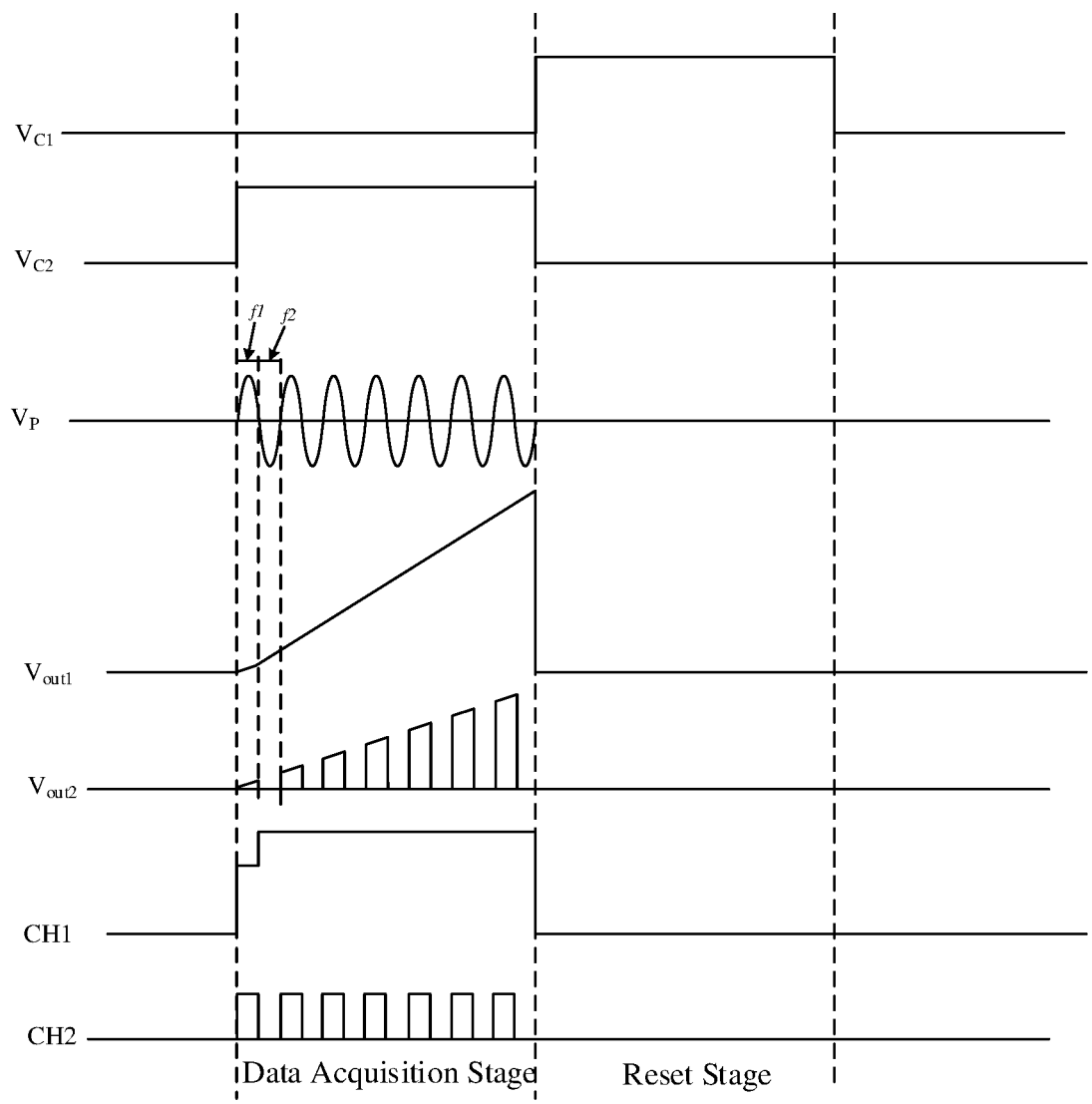
FIG. 11 is a timing chart of an ultrasonic signal detection method provided by some embodiments of the present disclosure.

Some embodiments of the present disclosure also provide an ultrasonic signal detection method of the ultrasonic signal detection circuit according to any one of the above embodiments, FIG. 10 is a flow chart of an ultrasonic signal detection method provided by some embodiments of the present disclosure, and FIG. 11 is a timing chart of an ultrasonic signal detection method provided by some embodiments of the present disclosure.

For example, as shown in FIG. 10, the ultrasonic signal detection method may include:

S10: in the data acquisition stage, detecting the ultrasonic echo signal, and generating the piezoelectric signal according to the ultrasonic echo signal; in the first sub-period, connecting the first power terminal and the output terminal of the control sub-circuit, under control of the first sub-signal, to transmit the power signal to the output terminal of the control sub-circuit; and in the second sub-period, connecting the first power terminal and the output terminal of the control sub-circuit, under control of the second sub-signal, to transmit the power signal to the output terminal of the control sub-circuit.

For example, as shown in FIGS. 3-7, the control sub-circuit includes a first control transistor T1 and a second control transistor T2. In some examples, referring to the circuit structure as shown in FIG. 3, in step S10, in the first sub-period, the first control transistor is controlled to be turned on and the second control transistor is controlled to be turned off by the first sub-signal, and the power signal is transmitted to the output terminal of the control sub-circuit via the first control transistor; and in the second sub-period, the first control transistor is controlled to be turned off and the second control transistor is controlled to be turned on by the second sub-signal, and the power signal is transmitted to the output terminal of the control sub-circuit via the second control transistor.

For example, in some other examples, referring to the circuit structures as shown in FIGS. 4-7, in step S10, the first control transistor is controlled to be turned on by the first sub-signal, a connection of the second control transistor and the sensing sub-circuit is turned off to keep the second control transistor to be turned on, and the power signal is transmitted to the output terminal of the control sub-circuit via the first control transistor and the second control transistor; and in the second sub-period, the second control transistor is controlled to be turned on by the second sub-signal, a connection of the first control transistor and the sensing sub-circuit are turned off to keep the first control transistor turned on, and the power signal is transmitted to the output terminal of the control sub-circuit via the first control transistor and the second control transistor.

It should be noted that the detailed working process of step S10 may refer to the relevant description in the embodiment of the ultrasonic signal detection circuit 100 described above, and the repetition thereof will not be repeated here again.

For example, by taking the ultrasonic signal detection circuit as shown in FIG. 5 as an example, as shown in FIGS. 5 and 11, in the data acquisition stage, the first control signal $V_{C1}$ output by the first control terminal Ctrl1 is a low-level signal, and the second control signal $V_{C2}$ output by the second control terminal Ctrl2 is a high-level signal, so that the switching transistor T3 is turned on, and both the first reset transistor T4 and the second reset transistor T5 are turned off. In the first sub-period f1 and the second sub-period f2, both the first control transistor T1 and the second control transistor T2 are turned on, and the power signal can be transmitted to the read signal line via the first control transistor T1 and the second control transistor T2, that is, the read signal line can read the power signal in the first sub-period f1 and the second sub-period f2 to obtain the first output signal $V_{out1}$. As shown in FIG. 11, the second output signal $V_{out2}$ is a signal detected by the circuit structure as shown in FIG. 1, in the circuit as shown in FIG. 1, in the first sub-period f1, the first transistor M1 is turned on, and the power signal can be output to the read signal line, while in the second sub-period f2, the first transistor M1 is turned off, so that the power signal cannot be transmitted to the read signal line, that is, the read signal line can only read the power signal in the first sub-period f1 to obtain the second output signal $V_{out2}$. It should be noted that the first output signal $V_{out1}$ and the second output signal $V_{out2}$ may be charge values accumulated in the data acquisition stage. In the present disclosure, because the read signal line can read the power signal in both the first sub-period and the second sub-period, charges can be accumulated in both the first sub-period and the second sub-period; and in the circuit as shown in FIG. 1, the read signal line can only read the power signal in the first sub-period, that is, charge can only be accumulated in the first sub-period, but charge cannot be accumulated in the second sub-period. Thus, the first output signal $V_{out1}$ is larger than the second output signal $V_{out2}$.

For example, as shown in FIG. 11, CH1 represents charge accumulation amount of the first output signal $V_{out1}$ in each sub-period, for the first output signal $V_{out1}$, the read signal line can receive charge in both the first sub-period f1 and the second sub-period f2 of the piezoelectric signal Vp. For the example as shown in FIG. 5, in the first sub-period f1 of the first period of the piezoelectric signal Vp, because only the first control transistor T1 of the control sub-circuit is turned on and the second control transistor T2 is turned off, the first control transistor T1 and the second control transistor T2 of the control sub-circuit are both turned on in the second sub-period f2 of the first period of the piezoelectric signal Vp and in the first sub-periods and second sub-periods of the remaining periods except the first period, thus, the charge accumulated amount in the first sub-period f1 of the first period of the piezoelectric signal Vp is less than the charge accumulated amount in the second sub-period f2 of the first period of the piezoelectric signal Vp, the charge accumulated amount in the second sub-period f2 of the first period of the piezoelectric signal Vp, the charge accumulated amount in the first sub-periods of the remaining periods, except the first period, of the piezoelectric signal Vp, and the charge accumulated amount in the second sub-periods of the remaining periods, except the first period, of the piezoelectric signal Vp, are all the same. In a case where the charge accumulation amount is linearly related to time, a slope of the first output signal $V_{out1}$ in the first sub-period f1 of the first period of the piezoelectric signal Vp is less than a slope of the first output signal $V_{out1}$ in the second sub-period f2 of the first period of the piezoelectric signal Vp. For example, the slope of the first output signal $V_{out1}$ in the second sub-period f2 of the first period of the piezoelectric signal Vp, a slope of the first output signal $V_{out1}$ in the first sub-period of the remaining periods, except the first period, of the piezoelectric signal Vp, and a slope of the first output signal $V_{out1}$ in the second sub-period of the remaining periods, except the first period, of the piezoelectric signal Vp, are all the same.

For example, as shown in FIG. 11, CH2 represents charge accumulation amount of the second output signal $V_{out2}$ in each sub-period, and for the second output signal $V_{out2}$, the read signal line can receive charge only in the first sub-period f1 of the piezoelectric signal Vp. In the circuit as shown in FIG. 1, in the first sub-period f1 of each period of the piezoelectric signal Vp, only the first transistor M1 is turned on, so that charge accumulated amounts in first sub-periods f1 of respective periods of the piezoelectric signal Vp are the same, and slopes of second output signals $V_{out2}$ in the first sub-periods f1 of respective periods of the piezoelectric signal Vp are the same.

For example, as shown in FIGS. 5 and 11, in the data acquisition stage, in the first sub-period of the first period, only the first control transistor T1 can transmit the power signal, while in the rest of the time, both the first control transistor T1 and the second control transistor T2 can transmit the power signal, so the signal output by the control sub-circuit is larger than that in the first sub-period of the first period.

For example, as shown in FIG. 11, the period of the piezoelectric signal Vp is much less than the duration of the data acquisition stage.

For example, as shown in FIG. 10, the ultrasonic signal detection method may further include:

S20: in a reset stage, resetting the control sub-circuit.

For example, as shown in FIGS. 5 and 11, in the reset stage, the first control signal $V_{C1}$ output by the first control terminal Ctrl1 is a high-level signal, and the second control signal $V_{C2}$ output by the second control terminal Ctrl2 is a low-level signal, so that the switching transistor T3 is turned off, and both the first reset transistor T4 and the second reset transistor T5 are turned on. The first reset signal Vrst1 is transmitted to the gate electrode of the first control transistor T1 via the first reset transistor T4, and the second reset signal Vrst2 is transmitted to the gate electrode of the second control transistor T2 via the second reset transistor T5, so that both the first control transistor T1 and the second control transistor T2 are reset.

It should be noted that the operation in the reset stage can be performed before the data acquisition stage, that is, the control sub-circuit is reset before each time of data acquisition. However, the embodiments of the present disclosure are not limited to this case. The operation in the reset stage can also be performed after the data acquisition stage, that is, the control sub-circuit is reset after each time of data acquisition.

For the present disclosure, the following points need to be explained:

(1) The drawings of the embodiments of the present disclosure only refer to the structures related to the embodiments of the present disclosure, and other structures may refer to the general design.

(2) In case of no conflict, the embodiments of the present disclosure and the features in the embodiments can be combined with each other to obtain new embodiments.

What have been described above merely are exemplary embodiments of the present disclosure, and not intended to define the scope of the present disclosure, and the scope of the present disclosure is determined by the appended claims.

What is claimed is:

1. An ultrasonic signal detection circuit, comprising a control sub-circuit, a sensing sub-circuit, an output switching sub-circuit, a read signal line, and a reset sub-circuit,
wherein the sensing, sub-circuit is configured to detect an ultrasonic echo signal and venerate a piezoelectric signal according to the ultrasonic echo signal, the piezoelectric signal comprises a first sub-signal and a second sub-signal, a voltage value of one of the first sub-signal and the second sub-signal is higher than a voltage value of a reference voltage signal, and a voltage value of the other of the first sub-signal and the second sub-signal is lower than the voltage value of the reference voltage signal; and
wherein the control sub-circuit is electrically connected to the sensing sub-circuit, and is configured to:
connect a first power terminal and an output terminal of the control sub-circuit, under control of the first sub-signal, to transmit a power signal to the output terminal of the control sub-circuit; and
connect the first power terminal and the output terminal of the control sub-circuit, under control of the second sub-signal, to transmit the power signal to the output terminal of the control sub-circuit,
wherein the piezoelectric signal is a periodic signal, the piezoelectric signal has a period that comprises a first sub-period and a second sub period, the first sub-signal corresponds to the first sub-period, and the second sub-signal corresponds to the second sub-period,
wherein the output switching sub-circuit is electrically connected to the output terminal of the control sub-circuit and the read signal line, and is configured to connect the output terminal of the control sub-circuit and the read signal line, in the first sub period and the second sub-period, to output the power signal from the read signal line,
wherein the reset sub-circuit is electrically connected to the control sub-circuit, and is configured to reset the control sub-circuit,
wherein the control sub-circuit comprises a first control transistor and a second control transistor, the reset sub-circuit comprises a first reset transistor, the output terminal of the control sub-circuit comprises a second electrode of the first control transistor and a second electrode of the second control transistor,
a first electrode of the first control transistor is electrically connected to the first power terminal to receive the power signal, the second electrode of the first control transistor is electrically connected to the output switching sub-circuit, a gate electrode of the first control transistor is electrically connected to a first electrode of the first reset transistor, and the gate electrode of the first control transistor is also electrically connected to an output terminal of the sensing sub-circuit;
a first electrode of the second control transistor is electrically connected to the first power terminal to receive the power signal, the second electrode of the second control transistor is electrically connected to the output switching sub-circuit, a gate electrode of the second control transistor is electrically connected to the first electrode of the first reset transistor, and the gate electrode of the second control transistor is also electrically connected to the output terminal of the sensing sub-circuit; and a second electrode of the first reset transistor is electrically connected to a first reset terminal, and a gate electrode of the first reset transistor is electrically connected to a first control terminal.

2. An ultrasonic signal detection circuit, comprising a control sub-circuit, a sensing sub-circuit, an output switching sub-circuit, a read signal line, and a reset sub-circuit, wherein the sensing sub-circuit is configured to detect an ultrasonic echo signal and generate a piezoelectric signal according to the ultrasonic echo signal, the piezoelectric signal comprises a first sub-signal and a second sub-signal, a voltage value of one of the first sub-signal and the second sub-signal is higher than a voltage value of a reference voltage signal, and a voltage value of the other of the first sub-signal and the second sub-signal is lower than the voltage value of the reference voltage signal; and wherein the control sub-circuit is electrically connected to the sensing sub-circuit, and is configured to:
connect a first power terminal and an output terminal of the control sub-circuit, under control of the first sub-signal, to transmit a power signal to the output terminal of the control sub-circuit, and
connect the first power terminal and the output terminal of the control sub-circuit, under control of the second sub-signal, to transmit the power signal to the output terminal of the control sub-circuit, wherein the piezoelectric signal is a periodic signal, the piezoelectric signal has a period that comprises a first sub-period and a second sub-period, the first sub-signal corresponds to the first sub period, and the second sub-signal corresponds to the second sub-period, wherein the output switching sub-circuit is electrically connected to the output terminal of the control sub-circuit and the read signal line, and is configured to connect the output terminal of the control sub-circuit and the read signal line, in the first sub-period and the second sub period, to output the power signal from the read signal line, wherein the reset sub-circuit is electrically connected to the control sub-circuit, and is configured to reset the control sub-circuit, wherein the control sub-circuit comprises a first control transistor and a second control transistor, the reset sub-circuit comprises a first reset transistor and a second reset transistor, the output terminal of the control sub-circuit comprises a second electrode of the first control transistor and a second electrode of the second control transistor, a first electrode of the first control transistor is electrically connected to the first power terminal to receive the power signal, the second electrode of the first control transistor is electrically connected to the output switching sub-circuit, and a gate electrode of the first control transistor is electrically connected to a first electrode of the first reset transistor;

a first electrode of the second control transistor is electrically connected to the first power terminal to receive the power signal, the second electrode of the second control transistor is electrically connected to the output switching sub-circuit, and a gate electrode of the second control transistor is electrically connected to a first electrode of the second reset transistor;

a second electrode of the first reset transistor is electrically connected to a first reset terminal, and a gate electrode of the first reset transistor is electrically connected to a first control terminal; and a second electrode of the second reset transistor is electrically connected to the first reset terminal, and a gate electrode of the second reset transistor is electrically connected to the first control terminal.

3. An ultrasonic signal detection circuit, comprising a control sub-circuit, a sensing sub-circuit, an output switching sub-circuit, a read signal line, and a reset sub-circuit, wherein the sensing sub-circuit is configured to detect an ultrasonic echo signal and generate a piezoelectric signal according to the ultrasonic echo signal, the piezoelectric signal comprises a first sub-signal and a second sub-signal, a voltage value of one of the first sub-signal and the second sub-signal is higher than a voltage value of a reference voltage signal, and a voltage value of the other of the first sub-signal and the second sub-signal is lower than the voltage value of the reference voltage signal; and wherein the control sub-circuit is electrically connected to the sensing sub-circuit, and is configured to:
connect a first power terminal and an output terminal of the control sub-circuit, under control of the first sub-signal, to transmit a power signal to the output terminal of the control sub-circuit, and
connect the first power terminal and the output terminal of the control sub-circuit, under control of the second sub-signal, to transmit the power signal to the output terminal of the control sub-circuit, wherein the piezoelectric signal is a periodic signal, the piezoelectric signal has a period that comprises a first sub-period and a second sub-period, the first sub-signal corresponds to the first sub-period, and the second sub-signal corresponds to the second sub-period, wherein the output switching sub-circuit is electrically connected to the output terminal of the control sub-circuit and the read signal line, and is configured to connect the output terminal of the control sub-circuit and the read signal line, in the first sub-period and the second sub-period, to output the power signal from the read signal line, wherein the reset sub-circuit is electrically connected to the control sub-circuit, and is configured to reset the control sub-circuit, wherein the control sub-circuit comprises a first control transistor and a second control transistor, the reset sub-circuit comprises a first reset transistor and a second reset transistor, the output terminal of the control sub-circuit comprises a second electrode of the first control transistor and a second electrode of the second control transistor, a first electrode of the first control transistor is electrically connected to the first power terminal to receive the power signal, the second electrode of the first control transistor is electrically connected to the output switching sub-circuit, and a gate electrode of the first control transistor is electrically connected to a first electrode of the first reset transistor;

a first electrode of the second control transistor is electrically connected to the first power terminal to receive the power signal, the second electrode of the second control transistor is electrically connected to the output switching sub-circuit, and a gate electrode of the second control transistor is electrically connected to a first electrode of the second reset transistor;

a second electrode of the first reset transistor is electrically connected to a first reset terminal, and a gate electrode of the first reset transistor is electrically connected to a first control terminal; and a second electrode of the second reset transistor is electrically connected to a second reset terminal, and a gate electrode of the second reset transistor is electrically connected to the first control terminal.

4. The ultrasonic signal detection circuit according to claim 2, wherein the control sub-circuit further comprises a first diode and a second diode, a first electrode of the first diode is electrically connected to an output terminal of the sensing sub-circuit, and a second electrode of the first diode is electrically connected to the gate electrode of the first control transistor; and a first electrode of the second diode is electrically connected to the gate electrode of the second control transistor, and a second electrode of the second diode is electrically connected to the output terminal of the sensing sub-circuit.

5. The ultrasonic signal detection circuit according to claim 4, wherein the first electrode of the first diode is a positive electrode of the first diode, the second electrode of the first diode is a negative electrode of the first diode, the first electrode of the second diode is a positive electrode of the second diode, and the second electrode of the second diode is a negative electrode of the second diode.

6. The ultrasonic signal detection circuit according to claim 4, wherein the control sub-circuit further comprises a first capacitor and a second capacitor, a first terminal of the first capacitor is electrically connected to the gate electrode of the first control transistor, a second terminal of the first capacitor is electrically connected to a second power terminal, a first terminal of the second capacitor is electrically connected to the gate electrode of the second control transistor, and a second terminal of the second capacitor is electrically connected to a third power terminal.

7. The ultrasonic signal detection circuit according to claim 1, wherein the first control transistor and the second control transistor are different types of transistors.

8. The ultrasonic signal detection circuit according to claim 1, wherein the output switching sub-circuit comprises a switching transistor, a first electrode of the switching transistor is respectively electrically connected to the second electrode of the first control transistor and the second electrode of the second control transistor, a second electrode of the switching transistor is electrically connected to the read signal line, and a gate electrode of the switching transistor is electrically connected to a second control terminal.

9. The ultrasonic signal detection circuit according to claim 1, wherein a duration of the first sub-period is identical to a duration of the second sub-period.

10. The ultrasonic signal detection circuit according to claim 1, wherein the first sub-period and the second sub-period are adjacent in time, and are alternately arranged.

11. The ultrasonic signal detection circuit according to claim 1, wherein the piezoelectric signal is a sinusoidal voltage signal.

12. The ultrasonic signal detection circuit according to claim 1, wherein the sensing sub-circuit comprises an ultrasonic sensor, a first terminal of the ultrasonic sensor is electrically connected to the control sub-circuit, and a second terminal of the ultrasonic sensor is electrically connected to a reference voltage terminal to receive the reference voltage signal.

13. A display panel, comprising a base substrate and the ultrasonic signal detection circuit according to claim 1, wherein the ultrasonic signal detection circuit is provided on the base substrate.

14. An ultrasonic signal detection method of the ultrasonic signal detection circuit according to claim 1, comprising:

in a data acquisition stage, detecting the ultrasonic echo signal, and generating the piezoelectric signal according to the ultrasonic echo signal;

in the first sub-period, connecting the first power terminal and the output terminal of the control sub-circuit, under control of the first sub-signal, to transmit the power signal to the output terminal of the control sub-circuit; and in the second sub-period, connecting the first power terminal and the output terminal of the control sub-circuit, under control of the second sub-signal, to transmit the power signal to the output terminal of the control sub-circuit.

15. The ultrasonic signal detection method according to claim 14, wherein in the first sub-period, the first control transistor is controlled to be turned on and the second control transistor is controlled to be turned off by the first sub-signal, and the power signal is transmitted to the output terminal of the control sub-circuit via the first control transistor; and in the second sub-period, the first control transistor is controlled to be turned off and the second control transistor is controlled to be turned on by the second sub-signal, and the power signal is transmitted to the output terminal of the control sub-circuit via the second control transistor.

16. The ultrasonic signal detection method according to claim 14, wherein in the first sub-period, by the first sub-signal, the first control transistor is controlled to be turned on, a connection of the second control transistor and the sensing sub-circuit is turned off to turn on the second control transistor, and the power signal is transmitted to the output terminal of the control sub-circuit via the first control transistor and the second control transistor; and in the second sub-period, the second control transistor is controlled to be turned on by the second sub-signal, a connection of the first control transistor and the sensing sub-circuit is turned off to turn on the first control transistor, and the power signal is transmitted to the output terminal of the control sub-circuit via the first control transistor and the second control transistor.

* * * * *